US009995918B2

(12) United States Patent
Okumura (10) Patent No.: US 9,995,918 B2
(45) Date of Patent: Jun. 12, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Tetsuichiro Okumura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/355,468

(22) Filed: Nov. 18, 2016

(65) Prior Publication Data

US 2017/0160526 A1 Jun. 8, 2017

(30) Foreign Application Priority Data

Dec. 3, 2015 (JP) .................... 2015-236483

(51) Int. Cl.
| | |
|---|---|
| *G02B 15/14* | (2006.01) |
| *G02B 15/173* | (2006.01) |
| *G02B 5/00* | (2006.01) |
| *G02B 15/20* | (2006.01) |
| *G02B 27/00* | (2006.01) |

(52) U.S. Cl.
CPC ........... *G02B 15/173* (2013.01); *G02B 5/005* (2013.01); *G02B 15/20* (2013.01); *G02B 27/0025* (2013.01)

(58) Field of Classification Search
CPC ...... G02B 15/173; G02B 5/005; G02B 15/20; G02B 27/0025; G02B 15/14
USPC ................................. 359/676, 684
See application file for complete search history.

(56) References Cited

U.S. PATENT DOCUMENTS

| | | | | |
|---|---|---|---|---|
| 5,880,892 | A * | 3/1999 | Ohtake ................ | G02B 15/173 359/676 |
| 9,253,382 | B2 | 2/2016 | Okumura | |
| 9,509,912 | B2 | 11/2016 | Okumura | |
| 2006/0268244 | A1* | 11/2006 | Lin ...................... | G03B 21/142 353/101 |
| 2007/0263294 | A1* | 11/2007 | Yamada ............... | G02B 15/177 359/680 |
| 2008/0316616 | A1* | 12/2008 | Kawana ................ | G02B 13/22 359/683 |
| 2014/0146216 | A1* | 5/2014 | Okumura ............. | G02B 15/173 348/340 |

FOREIGN PATENT DOCUMENTS

| | | |
|---|---|---|
| EP | 2669843 A2 | 12/2013 |
| JP | 2012047814 A | 3/2012 |
| JP | 2013-246422 A | 12/2013 |

* cited by examiner

*Primary Examiner* — James Greece
(74) *Attorney, Agent, or Firm* — Carter, DeLuca, Farrell & Schmidt, LLP (57) ABSTRACT

Provided is a zoom lens, including, in order from an object side to an image side: a first lens unit having a positive refractive power; a second lens unit having a negative refractive power; a third lens unit having a positive refractive power; a fourth lens unit having a positive refractive power; a fifth lens unit having a negative refractive power; and a sixth lens unit having a positive refractive power, in which an interval between the first lens unit and the second lens unit is increased during zooming from a wide angle end to a telephoto end, an interval between adjacent lens units is changed during zooming, and the lens shapes of lenses included in the first lens unit are appropriately set.

15 Claims, 9 Drawing Sheets

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup optical system to be used in an image pickup apparatus, such as a digital camera, a video camera, a broadcasting camera, a monitoring camera, or a silver-halide film camera.

Description of the Related Art

In recent years, as image pickup optical systems to be used in image pickup apparatus, such zoom lenses have been demanded that are small and light-weight as a whole and have a short total lens length and a high zoom ratio. As zoom lenses satisfying those demands, there have been known positive lead type zoom lenses in which a lens unit having a positive refractive power is arranged closest to an object side.

In Japanese Patent Application Laid-Open No. 2012-47814, there is disclosed a zoom lens including, in order from an object side to an image side, a first lens unit to a sixth lens unit having positive, negative, positive, positive, negative, and positive refractive powers, and is configured to change an interval between adjacent lens units during zooming.

It is relatively easy to obtain a positive lead type zoom lens that is small as a whole and has a high zoom ratio. In positive lead type zoom lenses, an axial ray passes through a first lens unit at a position away from an optical axis in many cases. Thus, in the positive lead type zoom lenses, an effective diameter of the first lens unit tends to be increased, leading to the large first lens unit. Further, when a zoom ratio is increased while a focal length at a telephoto end is long, various aberrations such as a spherical aberration, coma, and a chromatic aberration are generated in the first lens unit by a large amount on the telephoto side of a zoom range.

In the positive lead type zoom lenses, the lens structure of the first lens unit greatly affects the optical characteristics of the zoom lens, and the size of the first lens unit greatly affects the entire size and weight of the zoom lens. Accordingly, in order to obtain a positive lead type zoom lens that is small and light-weight as a whole and has a high zoom ratio and high optical characteristics over an entire zoom range, it is important to appropriately determine the lens structure of a first lens unit in addition to the number of lens units and refractive powers of the respective lens units.

SUMMARY OF THE INVENTION

It is an object of the present invention to provide a small and light-weight zoom lens having a high zoom ratio and satisfactory optical characteristics over an entire zoom range, and an image pickup apparatus including the zoom lens.

According to one embodiment of the present invention, there is provided a zoom lens, comprising, in order from an object side to an image side:
 a first lens unit having a positive refractive power;
 a second lens unit having a negative refractive power;
 a third lens unit having a positive refractive power;
 a fourth lens unit having a positive refractive power;
 a fifth lens unit having a negative refractive power; and
 a sixth lens unit having a positive refractive power,
in which an interval between the first lens unit and the second lens unit is increased during zooming from a wide angle end to a telephoto end,
in which an interval between adjacent lens units is changed during zooming, and
in which the first lens unit consists of, in order from the object side to the image side, a positive lens G11 having a convex surface facing the object side and a meniscus negative lens G12 having a convex surface facing the object side.

Further features of the present invention will become apparent from the following description of exemplary embodiments with reference to the attached drawings.

DESCRIPTION OF THE EMBODIMENTS

Now, exemplary embodiments of the present invention are described with reference to the attached drawings. The zoom lens according to the present invention includes, in order from an object side to an image side: a first lens unit having a positive refractive power; a second lens unit having a negative refractive power; a third lens unit having a positive refractive power; a fourth lens unit having a positive refractive power; a fifth lens unit having a negative refractive power; and a sixth lens unit having a positive refractive power. An interval between the first lens unit and the second lens unit is increased during zooming from a wide angle end to a telephoto end. An interval between adjacent lens units is changed during zooming.

Figure 1:
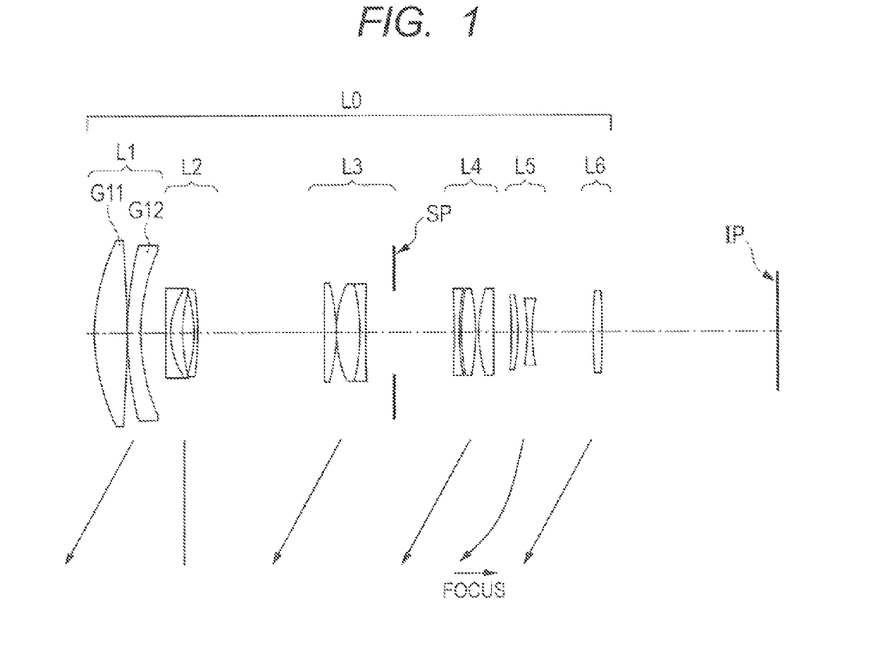
FIG. 1 is a lens cross-sectional view of a zoom lens according to Example 1 of the present invention.
Figure 2A:
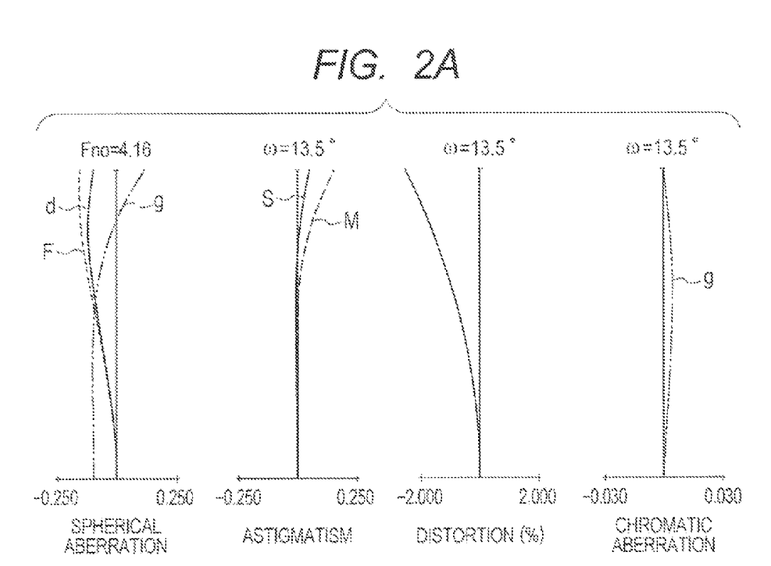
FIG. 2A is diagrams of various aberrations in the zoom lens of Example 1 at an infinity end at a wide angle end.
Figure 2B:
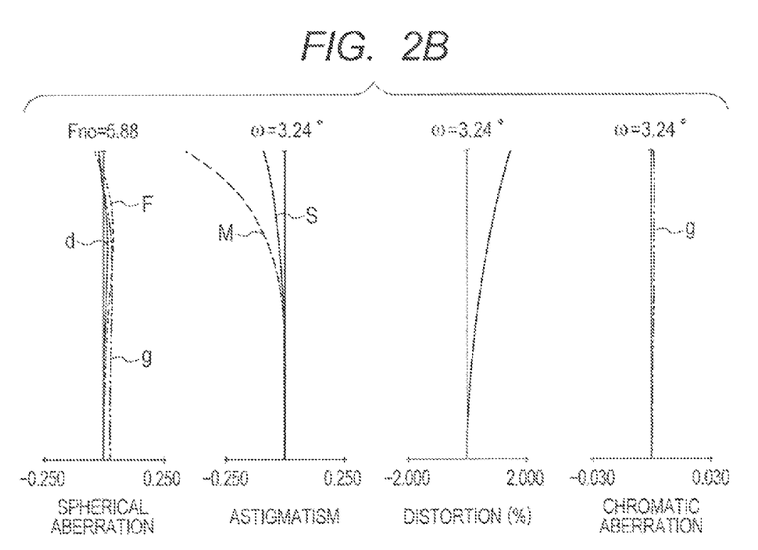
FIG. 2B is diagrams of various aberrations in the zoom lens of Example 1 at the infinity end at a telephoto end.

FIG. 1 is a lens cross-sectional view of a zoom lens according to Example 1 of the present invention when focusing on an object at infinity at a wide angle end (short focal length end). FIG. 2A is aberration diagrams of the zoom lens of Example 1 when focusing on the object at infinity at the wide angle end. FIG. 2B is aberration diagrams of the zoom lens of Example 1 when focusing on the object at infinity at a telephoto end (long focal length end). The zoom lens of Example 1 has a zoom ratio of 4.25 and an F-number of from about 4.16 to about 5.88.

Figure 3:
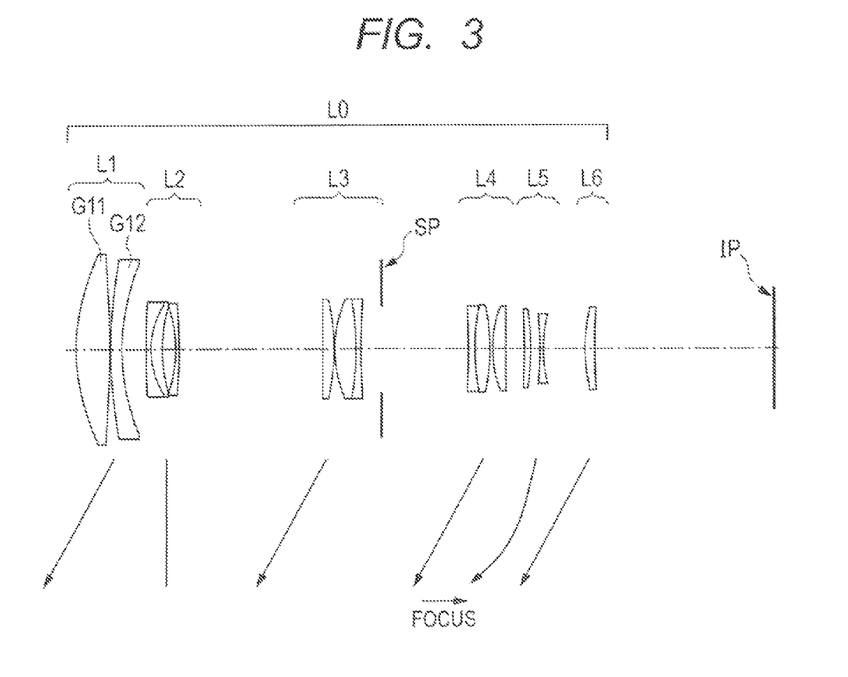
FIG. 3 is a lens cross-sectional view of a zoom lens according to Example 2 of the present invention.
Figure 4A:
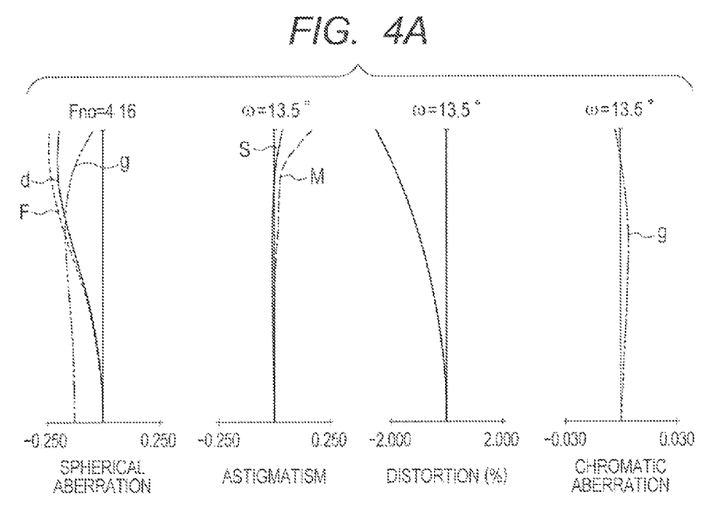
FIG. 4A is diagrams of various aberrations in the zoom lens of Example 2 at the infinity end at the wide angle end.
Figure 4B:
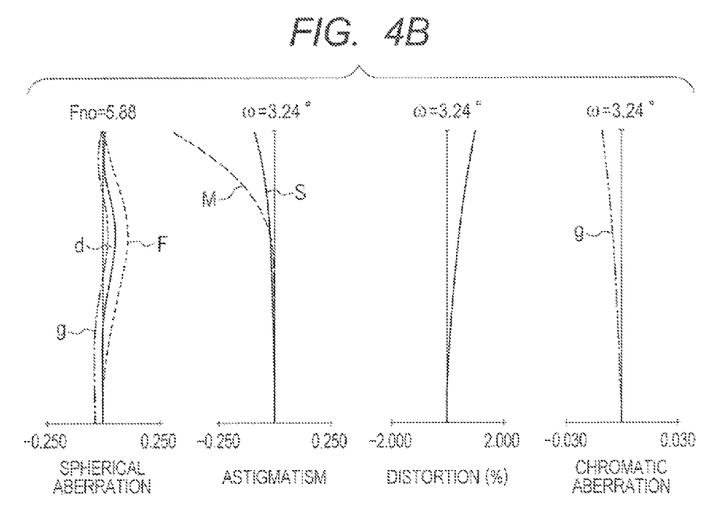
FIG. 4B is diagrams of various aberrations in the zoom lens of Example 2 at the infinity end at the telephoto end.

FIG. 3 is a lens cross-sectional view of a zoom lens according to Example 2 of the present invention when focusing on the object at infinity at the wide angle end. FIG. 4A is aberration diagrams of the zoom lens of Example 2 when focusing on the object at infinity at the wide angle end. FIG. 4B is aberration diagrams of the zoom lens of Example 2 when focusing on the object at infinity at the telephoto end. The zoom lens of Example 2 has a zoom ratio of 4.25 and an F-number of from about 4.16 to about 5.88.

Figure 5:
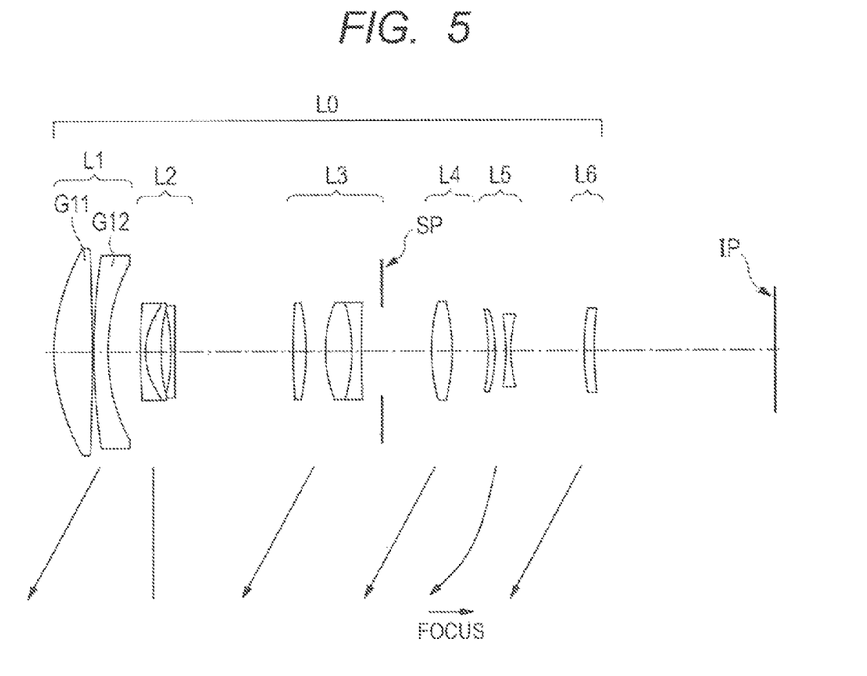
FIG. 5 is a lens cross-sectional view of a zoom lens according to Example 3 of the present invention.
Figure 6A:
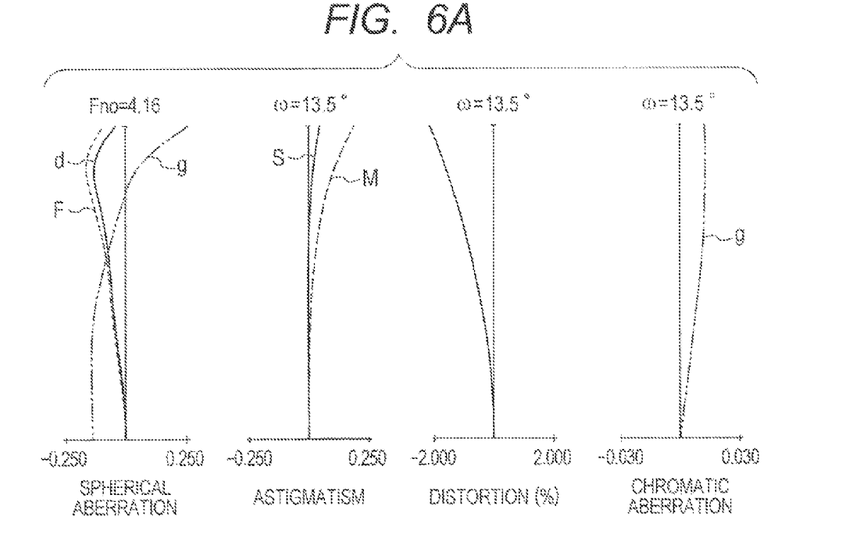
FIG. 6A is diagrams of various aberrations in the zoom lens of Example 3 at the infinity end at the wide angle end.
Figure 6B:
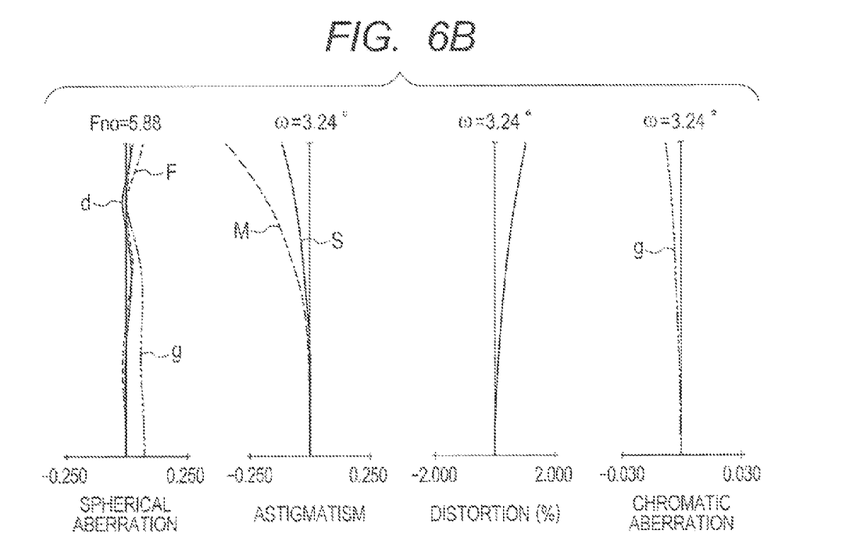
FIG. 6B is diagrams of various aberrations in the zoom lens of Example 3 at the infinity end at the telephoto end.

FIG. 5 is a lens cross-sectional view of a zoom lens according to Example 3 of the present invention when focusing on the object at infinity at the wide angle end. FIG. 6A is aberration diagrams of the zoom lens of Example 3 when focusing on the object at infinity at the wide angle end. FIG. 6B is aberration diagrams of the zoom lens of Example 3 when focusing on the object at infinity at the telephoto end. The zoom lens of Example 3 has a zoom ratio of 4.25 and an F-number of from about 4.16 to about 5.88.

Figure 7:
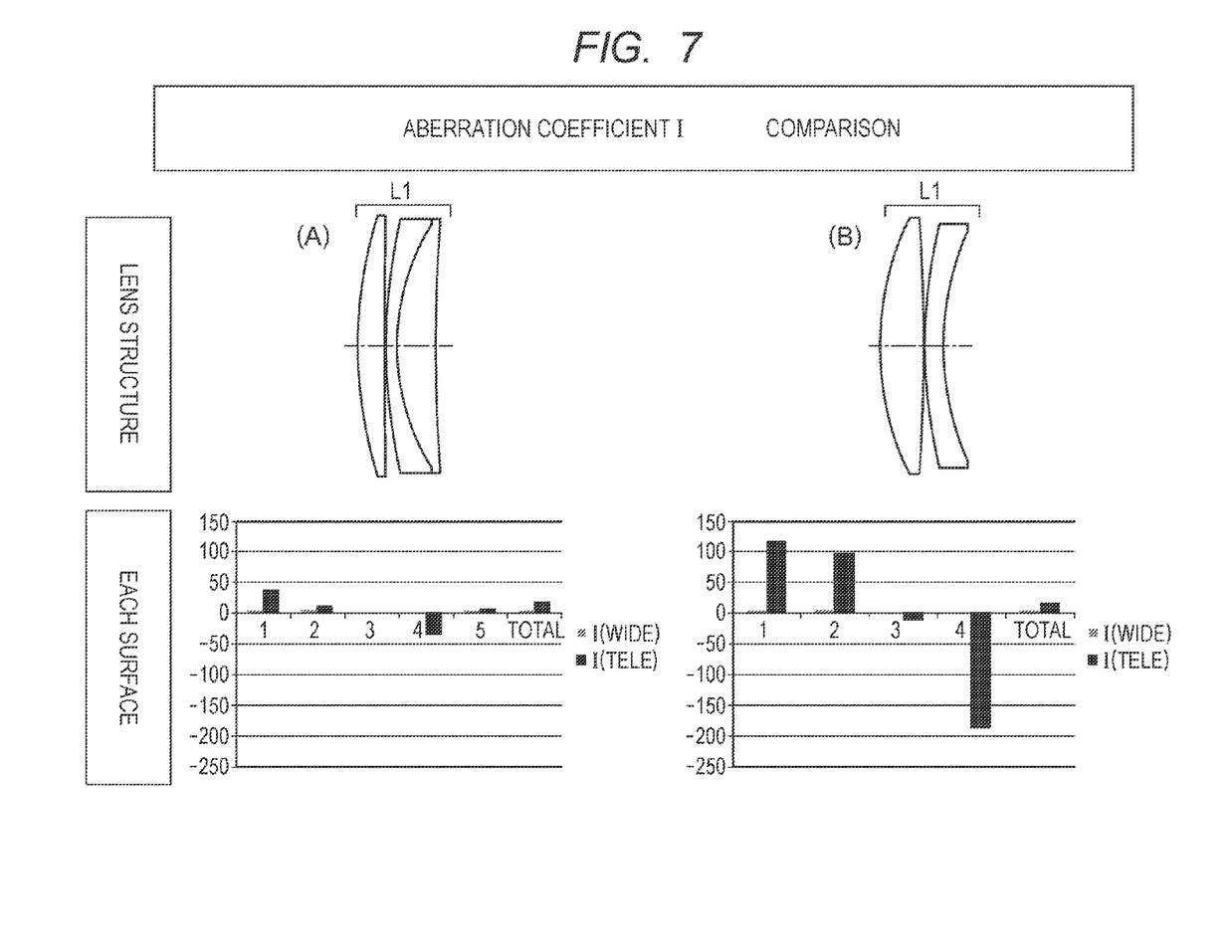
FIG. 7 is a graph for showing a relationship between the structure of a first lens unit and an aberration coefficient I.
Figure 8:
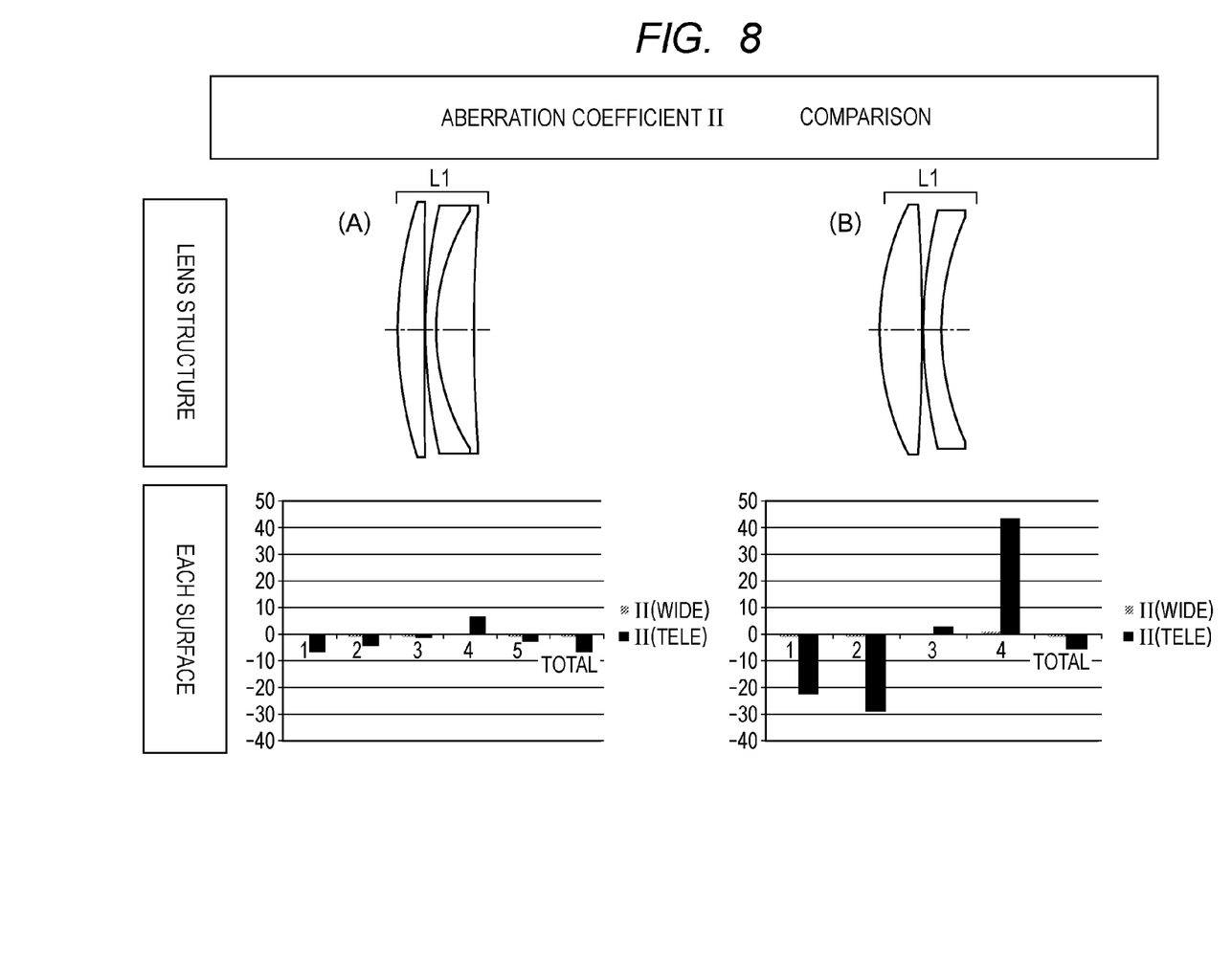
FIG. 8 is a graph for showing a relationship between the structure of the first lens unit and an aberration coefficient II.
Figure 9:
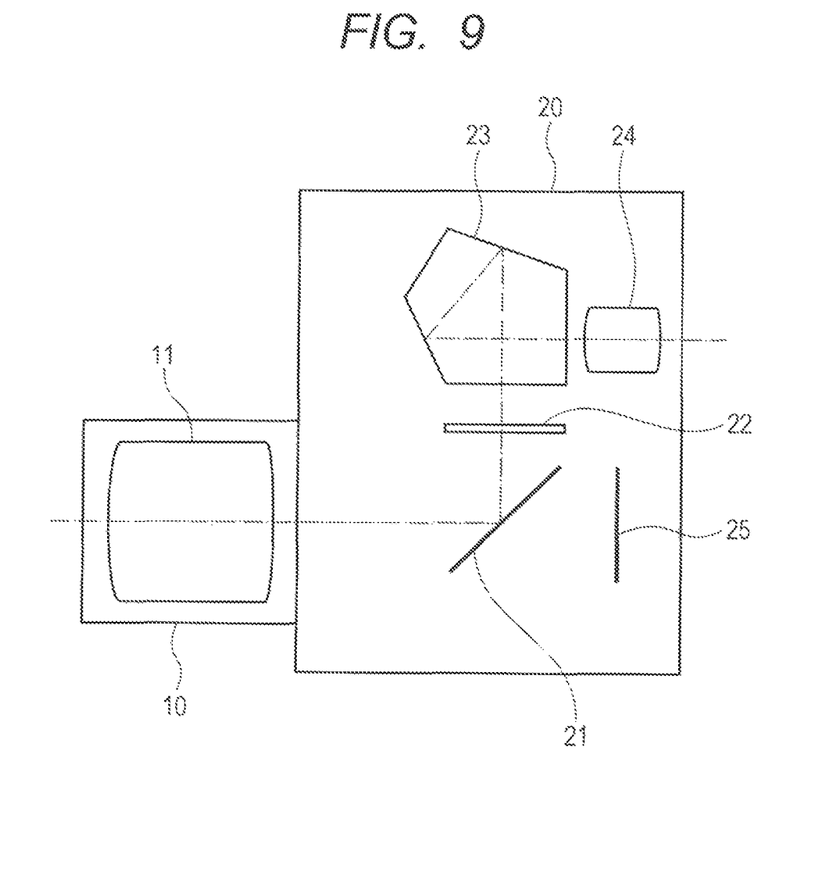
FIG. 9 is a schematic diagram of a main part of an image pickup apparatus according to the present invention.

FIG. 7 is an explanatory diagram for showing a relationship between the lens structure of a first lens unit of a positive lead type zoom lens and an aberration coefficient I. FIG. 8 is an explanatory diagram for showing a relationship between the lens structure of the first lens unit of the positive lead type zoom lens and an aberration coefficient II. FIG. 9 is a schematic diagram of a main part of an image pickup apparatus according to the present invention.

The zoom lens of each Example is a zoom lens to be used in image pickup apparatus such as a digital camera, a video camera, a broadcasting camera, a monitoring camera, and a silver-halide film camera. The zoom lens of each Example may also be used as a projection optical system for a projection apparatus (projector).

In the lens cross-sectional views, the left side is the object side (front), and the right side is the image side (rear). A zoom lens L0 is illustrated in each of the lens cross-sectional views. When the order of a lens unit from the object side is represented by i, the i-th lens unit is represented by Li. An aperture stop SP is also illustrated. An image plane IP corresponds to an image pickup surface of an image pickup element (photo-electric conversion element) such as a CCD sensor or a CMOS sensor when the zoom lens is used as an image pickup apparatus for a digital camera, a video camera, or the like.

When the zoom lens is used as an image pickup apparatus of a silver-halide film camera, the image plane IP corresponds to a film surface. During zooming from the wide angle end to the telephoto end, a first lens unit L1 and a third lens unit L3 to a sixth lens unit L6 are configured to move toward the object side as indicated by the arrows. A second lens unit L2 is configured not to move. An interval between adjacent lens units is changed during zooming. A fifth lens unit L5 is configured to move toward the image side as indicated by the arrow related to focusing, during focusing from infinity to a close distance.

In the spherical aberration diagram, an F-number is represented by Fno. Further, d indicates d-line (wavelength: 587.6 nm), g indicates g-line (wavelength: 435.8 nm), and F indicates F-line (wavelength: 435.8 nm). In the astigmatism diagram, M indicates a meridional image plane at the d-line and S indicates a sagittal image plane at the d-line. The distortion aberration diagram is an illustration about the d-line. The lateral chromatic aberration diagram is an illustration of the g-line with respect to the d-line. A half angle of view (degree) is represented by ω.

The zoom lens of each Example includes lens units arranged as follows in order from the object side to the image side. The zoom lens includes the first lens unit L1 having a positive refractive power, the second lens unit L2 having a negative refractive power, the third lens unit L3 having a positive refractive power, an aperture stop SP, the fourth lens unit L4 having a positive refractive power, the fifth lens unit L5 having a negative refractive power, and the sixth lens unit L6 having a positive refractive power.

In each Example, an interval between adjacent lens units is changed during zooming. Specifically, at the telephoto end, as compared to the wide angle end, an interval between the first lens unit L1 and the second lens unit L2 is large, an interval between the second lens unit L2 and the third lens unit L3 is small, an interval between the third lens unit L3 and the fourth lens unit L4 is small, an interval between the fourth lens unit L4 and the fifth lens unit L5 is small, and an interval between the fifth lens unit L5 and the sixth lens unit L6 is large. The aperture stop SP is arranged between the third lens unit L3 and the fourth lens unit L4, and is configured to move integrally with (along the same locus as) the third lens unit L3 during zooming.

In the zoom lens of the present invention, the first lens unit L1 consists of, in order from the object side to the image side, a positive lens G11 having a convex surface facing the object side and a meniscus negative lens G12 having a convex surface facing the object side.

A positive lead type zoom lens including a first lens unit L1 consisting of three lenses is described. That is, the first lens unit L1 consists of, in order from an object side to an image side, a positive lens having a convex surface facing the object side and a cemented lens obtained by cementing a meniscus negative lens having a convex surface facing the object side and a positive lens. When the first lens unit L1 consists of the three lenses, a spherical aberration, coma, a chromatic aberration, and the like are easily corrected on a telephoto side where an axial ray travels at a high position.

Here, the structure of the first lens unit L1 consisting of, in order from the object side to the image side, a positive lens, a negative lens, and a positive lens is referred to as a structure A. Further, the structure of the first lens unit L1 consisting of, in order from the object side to the image side, a positive lens and a meniscus negative lens as in the present invention is referred to as a structure B. Aberration coefficients I and II in those cases are described. FIG. 7 and FIG. 8 are explanatory diagrams of the aberration coefficients I and II generated in each lens surface. In the graphs of FIG. 7 and FIG. 8, the horizontal axis represents the surface number and the vertical axis represents the aberration coefficient.

Total aberration coefficients of the aberration coefficients I and II are substantially the same between the above-mentioned lens structures of the first lens units L1, and hence it is conceivable that both the structures have almost the same aberration generation amount as the first lens unit L1. However, the aberration coefficients in each lens surface are greatly different between the structures. First, in the structure A of the first lens unit L1 consisting of the three lenses, the aberration coefficients in each lens surface have a small value.

It is conceivable that this is because aberration is corrected to reduce an amount of aberration generated in each lens surface. On the other hand, in the structure B of the present invention consisting of the two lenses, an amount of aberration generated in each lens surface is large. This is because aberration is corrected by generating aberrations in the respective lens surfaces such that the aberrations are cancelled out by each other. In consideration of correction of a chromatic aberration, the two lenses of the structure B are one positive lens made of a low dispersion glass material and one negative lens made of a high dispersion glass material. In the structure B, the number of positive lenses is smaller than that in the structure A, and hence the power of the positive lens is increased and the aberration coefficients in each lens surface of the positive lens are increased.

In the present invention, aberration is corrected by generating aberration such that the aberration coefficients I and II, which are generated in the positive lens by a large amount, are cancelled out by the image-side lens surface of the meniscus negative lens having a convex surface facing the object side. The zoom lens of the present invention includes the first lens unit L1 consisting of, in order from the object side to the image side, the positive lens and the meniscus negative lens having a convex surface facing the object side, and consequently obtains satisfactorily optical characteristics with a small number of lenses.

In order to reduce the first lens unit L1 in weight, it is preferred to use a resin material as a material of the negative lens in the first lens unit L1. Use of resin materials generally has a problem in that the zoom lens is often out of focus due to temperature change. However, the refractive power of the negative lens in the first lens unit L1 is relatively weak in a telephoto zoom lens, and hence the zoom lens is hardly affected by environmental change. Further, the positive lens and the negative lens are arranged in the first lens unit L1 in order from the object side to the image side. Thus, it is impossible to directly touch the negative lens made of a resin material, and hence the negative lens is prevented from being damaged.

In addition, it is preferred that the zoom lens of the present invention satisfy at least one of the following conditional expressions. A curvature radius of an object-side lens surface of the negative lens G12 is represented by r12a, and a curvature radius of an image-side lens surface of the negative lens G12 is represented by r12b. A focal length of the entire system at the wide angle end is represented by fw. A focal length of the negative lens G12 is represented by fG12. An Abbe number of a material of the positive lens G11 is represented by vdG11. A back focus at the wide angle end is represented by Skw. In this case, it is preferred to satisfy at least one of the following conditional expressions.

$$0.0<(r12a-r12b)/(r12a+r12b)\le 0.6 \quad (1)$$

$$0.6\le r12b/fw\le 3.5 \quad (2)$$

$$1.2\le |fG12/fw|\le 10.0 \quad (3)$$

$$55.0\le vdG11\le 100.0 \quad (4)$$

$$0.58<Skw/fw<1.00 \quad (5)$$

Next, technical meanings of the respective conditional expressions are described. The conditional expression (1) defines the lens shape of the meniscus negative lens in the first lens unit L1. An axial ray is greatly refracted by the image-side lens surface, to thereby balance a spherical aberration and coma in the first lens unit L1. When the value exceeds the upper limit of the conditional expression (1), aberrations such as a spherical aberration and coma are generated by a larger amount in the image-side lens surface of the meniscus negative lens G12, and hence it becomes difficult to obtain high optical characteristics. On the other hand, when the value falls below the lower limit of the conditional expression (1), the negative refractive power of the meniscus negative lens G12 is weakened, and hence it becomes difficult to correct a chromatic aberration in the first lens unit L1.

The conditional expression (2) defines a ratio of the curvature radius of the image-side lens surface of the meniscus negative lens G12 in the first lens unit L1 to the focal length of the entire system at the wide angle end. When the value exceeds the upper limit of the conditional expression (2), an effect of correcting aberrations such as a spherical aberration and coma in the image-side lens surface of the meniscus negative lens G12 is reduced, and hence it becomes difficult to obtain high optical characteristics. On the other hand, when the value falls below the lower limit of the conditional expression (2), an amount of aberration generated in the image-side lens surface of the meniscus negative lens G12 is increased, and hence it becomes difficult to correct a spherical aberration, coma, and the like in the first lens unit L1. Further, when the curvature radius is reduced, it becomes difficult to manufacture the lens.

The conditional expression (3) defines a ratio of the focal length of the meniscus negative lens G12 in the first lens unit L1 to the focal length of the entire system at the wide angle end. When the value exceeds the upper limit of the conditional expression (3), the negative refractive power of the meniscus negative lens G12 is weakened (an absolute value of the negative refractive power is reduced), and hence an effect of correcting a chromatic aberration in the first lens unit L1 is reduced. On the other hand, when the value falls below the lower limit of the conditional expression (3), the negative refractive power of the meniscus negative lens G12 is strengthened (the absolute value of the negative refractive power is increased), and hence it becomes difficult to correct a spherical aberration, coma, and the like in the first lens unit L1.

The conditional expression (4) relates to the Abbe number of the material of the positive lens G11 in the first lens unit L1. With respect to a chromatic aberration, when low dispersion glass is used for the positive lens included in the first lens unit L1, both of an axial and lateral chromatic aberrations may be easily corrected at the telephoto side. When the value exceeds the upper limit of the conditional expression (4), a chromatic aberration is excessively corrected by the positive lens G11 in the first lens unit L1. On the other hand, when the value falls below the lower limit of the conditional expression (4), a chromatic aberration is insufficiently corrected by the positive lens G11 in the first lens unit L1.

The conditional expression (5) relates to a ratio of the back focus Skw at the wide angle end and the focal length fw of the entire system at the wide angle end. When the value exceeds the upper limit of the conditional expression (5) and the back focus is increased, the refractive power of the first lens unit L1 and the refractive power of the second lens unit L2 are required to be weakened, which leads to an increase in total lens length. On the other hand, when the value falls below the lower limit of the conditional expression (5) and the back focus is excessively reduced, the zoom lens disadvantageously interferes with a quick return mirror when the zoom lens is applied to an interchangeable lens for single-lens reflex cameras.

It is more preferred to set the numerical value ranges of the conditional expressions (1) to (5) as follows.

$$0.20\le (r12a-r12b)/(r12a+r12b)\le 0.55 \quad (1a)$$

$$0.65\le r12b/fw\le 1.00 \quad (2a)$$

$$1.5\le |fG12/fw|\le 4.0 \quad (3a)$$

$$60.0\le vdG11\le 96.0 \quad (4a)$$

$$0.65<Skw/fw<0.80 \quad (5a)$$

Next, the lens structure of each Example of the present invention is described.

Example 1

The first lens unit L1 consists of, in order from the object side to the image side, the positive lens G11 having a convex surface facing the object side and the meniscus negative lens G12 having a convex surface facing the object side. Both the object-side surface and image plane-side surface of the negative lens G12 have an aspherical surface shape. Further, the negative lens G12 is made of a resin material. The second lens unit L2 consists of, in order from the object side to the image side, a cemented lens obtained by cementing a negative lens having a concave surface facing the object side and a meniscus positive lens having a convex surface facing the object side, and a negative lens having a concave surface facing the object side.

The third lens unit L3 consists of, in order from the object side to the image side, a positive lens having a convex surface facing the image side and a cemented lens obtained by cementing a positive lens having a convex surface facing the object side and a negative lens having a concave surface facing the object side. The aperture stop SP is arranged on the image side of the third lens unit L3. The fourth lens unit L4 consists of, in order from the object side to the image side, a negative lens having a concave surface facing the object side, a positive lens having a convex surface facing the object side, and a positive lens having a convex surface facing the object side.

The fifth lens unit L5 consists of, in order from the object side to the image side, a meniscus positive lens having a concave surface facing the object side and a negative lens having a concave surface facing the object side. The fifth lens unit L5 is configured to move toward the image plane side during focusing from infinity to close distance. The sixth lens unit L6 consists of a positive lens having a convex surface facing the object side.

Example 2

The lens structure of the first lens unit L1 is the same as that of Example 1. The second lens unit L2 consists of, in order from the object side to the image side, a cemented lens obtained by cementing a negative lens having a concave surface facing the image side and a meniscus positive lens having a convex surface facing the object side, and a negative lens having a concave surface facing the object side. The lens structure of the third lens unit L3 is the same as that of Example 1. The position of the aperture stop SP is also the same as that of Example 1.

The fourth lens unit L4 consists of, in order from the object side to the image side, a negative lens having a concave surface facing the object side, a positive lens having a convex surface facing the object side, and a positive lens having a convex surface facing the object side. The lens structure of the fifth lens unit L5 is the same as that of Example 1. The fifth lens unit L5 is configured to move toward the image plane side during focusing from infinity to close distance. The sixth lens unit L6 consists of a positive lens having a convex surface facing the object side.

Example 3

The lens structure of the first lens unit L1 is the same as that of Example 1. The second lens unit L2 consists of, in order from the object side to the image side, a cemented lens obtained by cementing a negative lens having a concave surface facing the image side and a meniscus positive lens having a convex surface facing the object side, and a negative lens having a concave surface facing the object side. The third lens unit L3 consists of, in order from the object side to the image side, a positive lens having a convex surface facing the object side and a cemented lens obtained by cementing a positive lens having a convex surface facing the object side and a negative lens having a concave surface facing the object side.

The aperture stop SP is arranged on the image side of the third lens unit L3. The fourth lens unit L4 consists of a positive lens having convex surfaces. The fifth lens unit L5 consists of, in order from the object side to the image side, a meniscus positive lens having a concave surface facing the object side and a negative lens having concave surfaces. The fifth lens unit L5 is configured to move toward the image plane side during focusing from infinity to close distance. The sixth lens unit L6 consists of a positive lens having a convex surface facing the object side.

A digital camera (image pickup apparatus) according to an embodiment of the present invention, which uses the zoom lens of the present invention as a photographing optical system, is described with reference to FIG. 9. A lens barrel 10 incorporates a zoom lens 11 according to any one of Examples 1 to 3. In a camera body 20, there are provided a quick return mirror 21 configured to reflect upward light fluxes taken in by the zoom lens 11, and a focusing screen 22 on which object images are formed by the zoom lens 11.

In addition, there are provided a pentagonal roof prism 23 configured to convert light fluxes from the focusing screen 22 into erect images, an eyepiece lens 24 for observing object images formed on the focusing screen 22, and an image pickup element 25 configured to receive light fluxes from the zoom lens 11, such as a CCD sensor or a CMOS sensor.

FIG. 9 is an illustration of the image pickup apparatus in an observation state, that is, a photographing standby state. When a photographer operates a release button, the mirror 21 is retracted from the illustrated optical path so that an object image may be taken in on the solid-state image pickup element 25. The present invention is also applicable to single lens reflex (SLR) cameras in a similar manner, which includes no quick return mirror. Further, the zoom lens of the present invention is also applicable to video cameras in a similar manner.

Specific numerical data of Examples 1 to 3 are described below. In each Example, i indicates the order from the object side, ri indicates the curvature radius of an i-th optical surface (i-th surface), di indicates an on-axis interval between the i-th surface and an (i+1)th surface, and ndi and vdi indicate the refractive index and Abbe number of a material of an optical member between the i-th surface and the (i+1)th surface with respect to the d-line, respectively. An aspherical shape is expressed by the following equation:

$$X = \frac{H^2/R}{1+\sqrt{1-(1+K)(H/R)^2}} + A4H^4 + A4H^6 + A8H^8 + A10H^{10} + A12H^{12}$$

where the X-axis represents an optical axis direction, the H-axis represents an axis in a direction perpendicular to the optical axis, a traveling direction of light is positive, R represents a paraxial curvature radius, K represents a conic constant, and A4, A6, A8, A10, and A12 represent aspherical coefficients, respectively.

The asterisk (*) indicates a surface having an aspherical shape. The notation "e-x" indicates $10^{-x}$. The notation "BF" indicates an air-equivalent back focus. The total lens length is a value obtained by adding the back focus BF to a distance from the first lens surface to the last lens surface. Moreover, a relationship between the conditional expressions described above and Examples 1 to 3 is shown in Table 1.

(Numerical Data 1)

Unit mm

Surface data

| Surface number i | ri | di | ndi | vdi | Effective diameter |
|---|---|---|---|---|---|
| 1 | 48.239 | 7.29 | 1.49700 | 81.5 | 41.02 |
| 2 | −285.954 | 0.20 | | | 40.41 |
| 3* | 83.279 | 3.00 | 1.58306 | 30.2 | 38.70 |
| 4* | 47.535 | (Variable) | | | 36.41 |
| 5 | −426.758 | 1.00 | 1.72458 | 50.2 | 19.22 |
| 6 | 17.993 | 2.72 | 1.80809 | 22.8 | 18.35 |
| 7 | 36.522 | 2.63 | | | 18.08 |
| 8 | −31.345 | 0.80 | 1.80400 | 46.6 | 18.09 |
| 9 | −79.092 | (Variable) | | | 18.54 |
| 10 | −301.698 | 2.62 | 1.80400 | 46.6 | 20.95 |
| 11 | −44.143 | 0.10 | | | 21.25 |
| 12 | 29.827 | 5.21 | 1.49700 | 81.5 | 21.13 |
| 13 | −48.378 | 1.40 | 1.91665 | 34.2 | 20.55 |
| 14 | 275.908 | 6.31 | | | 20.24 |
| 15 (Stop) | ∞ | (Variable) | | | 19.34 |
| 16 | −102.909 | 1.00 | 1.85433 | 32.5 | 18.42 |
| 17 | 40.604 | 0.31 | | | 18.50 |
| 18 | 57.001 | 3.27 | 1.72916 | 54.7 | 18.50 |
| 19 | −48.598 | 0.73 | | | 18.70 |
| 20 | 32.333 | 3.42 | 1.65844 | 50.9 | 18.52 |
| 21 | −589.109 | (Variable) | | | 17.97 |
| 22 | −93.360 | 1.55 | 1.76182 | 26.5 | 16.10 |
| 23 | −38.443 | 2.00 | | | 15.89 |
| 24 | −39.528 | 1.00 | 1.68437 | 56.6 | 14.33 |
| 25 | 32.062 | (Variable) | | | 13.75 |
| 26 | 132.749 | 1.97 | 1.54072 | 47.2 | 17.28 |
| 27 | −204.915 | (Variable) | | | 17.46 |
| Image plane | ∞ | | | | |

Aspherical Surface data

Third surface

K = 0.00000e+000 A4 = −4.82409e−008 A6 = −3.20726e−010
A8 = −4.69114e−013 A10 = −7.02763e−016 A12 = −1.00869e−019

Fourth surface

K = 0.00000e+000 A4 = 9.77507e−007 A6 = 3.68942e−010
A8 = −3.61221e−013 A10 = −7.63401e−016 A12 = −1.96184e−018

Various data
Zoom ratio 4.25

| | Wide angle | Intermediate | Telephoto |
|---|---|---|---|
| Focal length | 56.80 | 133.96 | 241.20 |
| F-number | 4.16 | 5.18 | 5.88 |
| Half angle of view (degree) | 13.52 | 5.82 | 3.24 |
| Image height | 13.66 | 13.66 | 13.66 |
| Total lens length | 155.00 | 190.45 | 210.00 |
| BF | 39.68 | 62.21 | 71.05 |
| d4 | 5.84 | 41.30 | 60.84 |
| d9 | 28.83 | 12.68 | 1.50 |
| d15 | 13.99 | 7.61 | 9.94 |
| d21 | 4.10 | 4.18 | 3.15 |
| d25 | 14.03 | 13.96 | 14.98 |
| d27 | 39.68 | 62.21 | 71.05 |
| Entrance pupil position | 48.67 | 144.90 | 243.04 |
| Exit pupil position | −44.55 | −37.47 | −41.11 |
| Front principal point position | 67.17 | 98.82 | −34.45 |
| Rear principal point position | −17.12 | −71.75 | −170.15 |

Zoom lens unit data

| Unit | First surface | Focal length | Lens structure length | Front principal point position | Rear principal point position |
|---|---|---|---|---|---|
| 1 | 1 | 135.17 | 10.49 | −5.47 | −11.87 |
| 2 | 5 | −28.49 | 7.15 | 3.21 | −1.91 |
| 3 | 10 | 46.08 | 15.63 | −0.38 | −12.21 |
| 4 | 16 | 46.25 | 8.74 | 5.41 | 0.15 |
| 5 | 22 | −38.04 | 4.55 | 4.02 | 0.51 |
| 6 | 26 | 149.29 | 1.97 | 0.50 | −0.78 |

Single lens data

| Lens | First surface | Focal length |
|---|---|---|
| 1 | 1 | 83.66 |
| 2 | 3 | −196.01 |
| 3 | 5 | −23.81 |
| 4 | 6 | 41.19 |
| 5 | 8 | −65.07 |
| 6 | 10 | 64.02 |
| 7 | 12 | 37.96 |
| 8 | 13 | −44.81 |
| 9 | 16 | −33.97 |
| 10 | 18 | 36.45 |
| 11 | 20 | 46.65 |
| 12 | 22 | 84.75 |
| 13 | 24 | −25.72 |
| 14 | 26 | 149.29 |

(Numerical Data 2)

Unit mm

Surface data

| Surface number i | ri | di | ndi | vdi | Effective diameter |
|---|---|---|---|---|---|
| 1 | 47.111 | 7.55 | 1.48749 | 70.2 | 41.02 |
| 2 | −217.750 | 0.20 | | | 40.43 |
| 3* | 107.076 | 2.50 | 1.58306 | 30.2 | 38.80 |
| 4* | 51.047 | (Variable) | | | 36.72 |
| 5 | 393.995 | 1.00 | 1.74950 | 35.3 | 20.00 |
| 6 | 18.914 | 2.60 | 1.92286 | 18.9 | 19.22 |
| 7 | 32.919 | 3.06 | | | 18.85 |
| 8 | −30.459 | 0.80 | 1.58913 | 61.1 | 18.85 |
| 9 | −130.959 | (Variable) | | | 19.34 |
| 10 | −1915.736 | 2.54 | 1.80400 | 46.6 | 20.75 |
| 11 | −51.903 | 0.20 | | | 20.99 |
| 12 | 28.596 | 4.80 | 1.49700 | 81.5 | 20.83 |
| 13 | −63.009 | 1.00 | 1.91082 | 35.3 | 20.25 |
| 14 | 128.891 | 4.14 | | | 19.91 |
| 15 (Stop) | ∞ | (Variable) | | | 19.37 |
| 16 | −125.242 | 1.29 | 1.82290 | 25.7 | 17.99 |
| 17 | 42.902 | 0.24 | | | 18.01 |
| 18 | 56.910 | 3.11 | 1.72342 | 38.0 | 18.01 |
| 19 | −53.334 | 0.68 | | | 18.14 |
| 20* | 25.213 | 2.98 | 1.58313 | 59.4 | 17.79 |
| 21 | 307.091 | (Variable) | | | 17.28 |
| 22 | −204.121 | 1.49 | 1.84666 | 23.8 | 16.26 |

-continued

| Unit mm | | | | | |
|---|---|---|---|---|---|
| 23 | −55.303 | 2.00 | | | 16.02 |
| 24 | −71.071 | 0.70 | 1.80400 | 46.6 | 14.43 |
| 25 | 25.122 | (Variable) | | | 13.88 |
| 26* | 44.821 | 2.09 | 1.58306 | 30.2 | 17.22 |
| 27* | 143.030 | (Variable) | | | 17.27 |
| Image plane | ∞ | | | | |

Aspherical Surface data

Third surface

K = 0.00000e+000 A4 = −3.28852e−009 A6 = −7.18541e−010
A8 = −1.03930e−012 A10 = −2.52055e−016 A12 = 1.95339e−018
Fourth surface K = 0.00000e+000 A4 = 1.17029e−006 A6 = 1.30889e−010
A8 = −1.52389e−012 A10 = −1.90898e−015 A12 = 5.52736e−018
Twentieth surface K = 0.00000e+000 A4 = −3.09458e−006 A6 = −2.96795e−010
A 8 = −1.17099e−010 A10 = 2.33552e−013 A12 = 1.96595e−015
Twenty-sixth surface K = 0.00000e+000 A4 = 1.72262e−007 A6 = −5.38878e−009
A8 = 1.59563e−009 A10 = −1.50506e−011 A12 = 2.97817e−014
Twenty-seventh surface K = 0.00000e+000 A4 = 2.08190e−007 A6 = 7.77213e−009
A8 = 6.48847e−010 A10 = 1.17877e−012 A12 = −5.99422e−014

Various data
Zoom ratio 4.25

| | Wide angle | Intermediate | Telephoto |
|---|---|---|---|
| Focal length | 56.80 | 133.00 | 241.20 |
| F-number | 4.16 | 5.18 | 5.88 |
| Half angle of view (degree) | 13.52 | 5.86 | 3.24 |
| Image height | 13.66 | 13.66 | 13.66 |
| Total lens length | 154.98 | 190.19 | 209.93 |
| BF | 39.68 | 63.72 | 76.81 |
| d4 | 5.41 | 40.62 | 60.36 |
| d9 | 31.63 | 14.21 | 1.50 |
| d15 | 19.88 | 13.27 | 12.89 |
| d21 | 4.10 | 3.27 | 2.03 |
| d25 | 9.30 | 10.13 | 11.37 |
| d27 | 39.68 | 63.72 | 76.81 |
| Entrance pupil position | 49.52 | 137.80 | 217.04 |
| Exit pupil position | −42.04 | −36.34 | −37.63 |
| Front principal point position | 66.84 | 94.01 | −50.15 |
| Rear principal point position | −17.12 | −69.28 | −164.39 |

Zoom lens unit data

| Unit | First surface | Focal length | Lens structure length | Front principal point position | Rear principal point position |
|---|---|---|---|---|---|
| 1 | 1 | 140.08 | 10.25 | −5.25 | −11.61 |
| 2 | 5 | −31.45 | 7.46 | 3.84 | −1.66 |
| 3 | 10 | 49.19 | 12.68 | −0.85 | −10.05 |
| 4 | 16 | 43.34 | 8.31 | 4.57 | −0.58 |
| 5 | 22 | −31.97 | 4.19 | 3.86 | 0.61 |
| 6 | 26 | 111.09 | 2.09 | −0.60 | −1.91 |

Single lens data

| Lens | First surface | Focal length |
|---|---|---|
| 1 | 1 | 80.20 |
| 2 | 3 | −170.11 |
| 3 | 5 | −26.54 |
| 4 | 6 | 44.23 |
| 5 | 8 | −67.57 |
| 6 | 10 | 66.31 |
| 7 | 12 | 40.28 |
| 8 | 13 | −46.35 |
| 9 | 16 | −38.70 |
| 10 | 18 | 38.51 |
| 11 | 20 | 46.92 |
| 12 | 22 | 89.18 |
| 13 | 24 | −23.01 |
| 14 | 26 | 111.09 |

(Numerical Data 3)

Unit mm

Surface data

| Surface number i | ri | di | ndi | vdi | Effective diameter |
|---|---|---|---|---|---|
| 1 | 42.265 | 8.20 | 1.60311 | 60.6 | 42.60 |
| 2 | −487.386 | 0.20 | | | 41.51 |
| 3* | 121.567 | 3.00 | 1.58306 | 30.2 | 39.38 |
| 4* | 39.929 | (Variable) | | | 35.32 |
| 5 | 228.854 | 1.00 | 1.92411 | 30.7 | 19.40 |
| 6 | 15.662 | 3.35 | 1.94719 | 18.9 | 18.04 |
| 7 | 43.921 | 2.01 | | | 17.76 |
| 8 | −40.012 | 0.80 | 1.73584 | 53.7 | 17.76 |
| 9 | 635.989 | (Variable) | | | 18.12 |
| 10* | 165.474 | 2.63 | 1.58306 | 30.2 | 19.11 |
| 11* | −55.960 | 4.12 | | | 19.34 |
| 12 | 28.337 | 5.60 | 1.49700 | 81.5 | 19.52 |
| 13 | −33.888 | 2.00 | 2.00069 | 25.5 | 19.04 |
| 14 | 262.367 | 4.23 | | | 19.07 |
| 15 (Stop) | ∞ | (Variable) | | | 19.43 |
| 16* | 42.636 | 4.31 | 1.58313 | 59.4 | 19.77 |
| 17* | −38.499 | (Variable) | | | 19.52 |
| 18 | −45.076 | 1.34 | 1.83400 | 37.2 | 16.31 |
| 19 | −33.037 | 2.31 | | | 16.24 |
| 20 | −38.593 | 1.00 | 1.49700 | 81.5 | 14.65 |
| 21 | 27.172 | (Variable) | | | 13.99 |
| 22 | 61.152 | 2.18 | 1.83400 | 37.2 | 16.66 |
| 23 | 89.037 | (Variable) | | | 16.79 |
| Image plane | ∞ | | | | |

Aspherical Surface data

Third surface

K = 0.00000e+000 A4 = −3.57241e−007 A6 = −1.28579e−009
A8 = −4.62925e−013 A10 = 2.101676−015 A12 = −8.407036−019
Fourth surface K = 0.00000e+000 A4 = 1.35466e−006 A6 = −3.99618e−010
A8 = −3.00824e−013 A10 = −8.25139e−017 A12 = 5.22754e−018
Tenth surface K = 0.00000e+000 A4 = −3.70891e−007 A6 = −3.86537e−009
A8 = 2.49758e−012 A10 = −5.53705e−014 A12 = −8.52614e−016
Eleventh surface K = 0.00000e+000 A4 = −2.01512e−006 A6 = −2.13755e−009
A8 = −1.78457e−011 A10 = −1.45810e−013 A12 = 2.56989e−016
Sixteenth surface K = 0.00000e+000 A4 = −5.99353e−006 A6 = 1.55071e−008
A8 = 1.14805e−010 A10 = −2.53371e−013 A12 = 1.86211e−014

-continued

Unit mm

Seventeenth surface

K = 0.00000e+000 A4 = 6.58617e-006 A6 = 2.82848e-008
A8 = -2.14273e-010 A10 = 3.26866e-012 A12 = 5.59603e-015

Various data
Zoom ratio 4.25

|  | Wide angle | Intermediate | Telephoto |
|---|---|---|---|
| Focal length | 56.80 | 137.00 | 241.19 |
| F-number | 4.16 | 5.07 | 5.88 |
| Half angle of view (degree) | 13.52 | 5.69 | 3.24 |
| Image height | 13.66 | 13.66 | 13.66 |
| Total lens length | 152.22 | 193.00 | 207.22 |
| BF | 38.00 | 55.53 | 69.48 |
| d4 | 7.03 | 47.81 | 62.03 |
| d9 | 25.04 | 12.66 | 1.50 |
| d15 | 10.67 | 5.53 | 2.74 |
| d17 | 7.66 | 6.15 | 6.51 |
| d21 | 15.54 | 17.05 | 16.69 |
| d23 | 38.00 | 55.53 | 69.48 |
| Entrance pupil position | 53.83 | 184.89 | 261.83 |
| Exit pupil position | -39.38 | -35.61 | -32.90 |
| Front principal point position | 68.94 | 115.97 | -65.23 |
| Rear principal point position | -18.79 | -81.46 | -171.72 |

Zoom lens unit data

| Unit | First surface | Focal length | Lens structure length | Front principal point position | Rear principal point position |
|---|---|---|---|---|---|
| 1 | 1 | 144.80 | 11.40 | -10.51 | -16.46 |
| 2 | 5 | -27.96 | 7.16 | 3.72 | -1.01 |
| 3 | 10 | 66.66 | 18.58 | -3.65 | -17.19 |
| 4 | 16 | 35.39 | 4.31 | 1.46 | -1.32 |
| 5 | 18 | -41.55 | 4.65 | 3.63 | -0.04 |
| 6 | 22 | 226.10 | 2.18 | -2.51 | -3.66 |

Single lens data

| Lens | First surface | Focal length |
|---|---|---|
| 1 | 1 | 64.86 |
| 2 | 3 | -103.38 |
| 3 | 5 | -18.23 |
| 4 | 6 | 24.30 |
| 5 | 8 | -51.13 |
| 6 | 10 | 72.04 |
| 7 | 12 | 32.01 |
| 8 | 13 | -29.89 |
| 9 | 16 | 35.39 |
| 10 | 18 | 141.18 |
| 11 | 20 | -31.92 |
| 12 | 22 | 226.10 |

TABLE 1

| | Conditional Expression | | | | |
|---|---|---|---|---|---|
| | (1) | (2) | (3) | (4) | (5) |
| Example 1 | 0.27 | 0.84 | 3.5 | 81.5 | 0.70 |
| Example 2 | 0.35 | 0.90 | 3.0 | 70.2 | 0.70 |
| Example 3 | 0.51 | 0.70 | 1.8 | 60.6 | 0.67 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-236483, filed Dec. 3, 2015, which is hereby incorporated by reference herein in its entirety.

What is claimed is:

1. A zoom lens, comprising, in order from an object side to an image side:
 a first lens unit having a positive refractive power;
 a second lens unit having a negative refractive power;
 a third lens unit having a positive refractive power;
 a fourth lens unit having a positive refractive power;
 a fifth lens unit having a negative refractive power; and
 a sixth lens unit having a positive refractive power,
 wherein an interval between the first lens unit and the second lens unit is increased during zooming from a wide angle end to a telephoto end,
 wherein an interval between adjacent lens units is changed during zooming,
 wherein the first lens unit consists of, in order from the object side to the image side, a positive lens G11 having a convex surface facing the object side and a meniscus negative lens G12 having a convex surface facing the object side, and
 wherein the following conditional expression is satisfied:

$$1.2 \leq |fG12/fw| \leq 10.0,$$

where fG12 represents a focal length of the meniscus negative lens G12, and fw represents a focal length of the zoom lens at the wide angle end.

2. A zoom lens according to claim 1, wherein the following conditional expression is satisfied:

$$0.0 < (r12a - r12b)/(r12a + r12b) \leq 0.6,$$

where r12a represents a curvature radius of an object-side lens surface of the meniscus negative lens G12, and r12b represents a curvature radius of an image-side lens surface of the meniscus negative lens G12.

3. A zoom lens according to claim 1, wherein the meniscus negative lens G12 is made of a resin material.

4. A zoom lens according to claim 1, wherein the following conditional expression is satisfied:

$$0.6 \leq r12b/fw \leq 3.5,$$

where r12b represents a curvature radius of an image-side lens surface of the meniscus negative lens G12.

5. A zoom lens according to claim 1, wherein the following conditional expression is satisfied:

$$55.0 \leq vdG11 \leq 100.0,$$

where vdG11 represents an Abbe number of a material of the positive lens G11.

6. A zoom lens according to claim 1, wherein the fifth lens unit is configured to move toward the image side during focusing from infinity to close distance.

7. A zoom lens according to claim 1, wherein the following conditional expression is satisfied:

$$0.58 < Skw/fw < 1.00,$$

where Skw represents a back focus at the wide angle end.

8. A zoom lens according to claim 1, wherein, during zooming from the wide angle end to the telephoto end, the second lens unit is configured not to move, and the first lens unit, the third lens unit, the fourth lens unit, the fifth lens unit, and the sixth lens unit are configured to move toward the object side.

9. A zoom lens according to claim 1, wherein the zoom lens consists of, in order from the object side to the image side:
    a first lens unit having a positive refractive power;
    a second lens unit having a negative refractive power;
    a third lens unit having a positive refractive power;
    a fourth lens unit having a positive refractive power;
    a fifth lens unit having a negative refractive power; and
    a sixth lens unit having a positive refractive power.

10. An image pickup apparatus, comprising:
    the zoom lens according to claim 1; and
    an image pickup element configured to receive an image formed by the zoom lens.

11. A zoom lens, comprising, in order from an object side to an image side:
    a first lens unit having a positive refractive power;
    a second lens unit having a negative refractive power;
    a third lens unit having a positive refractive power;
    a fourth lens unit having a positive refractive power;
    a fifth lens unit having a negative refractive power; and
    a sixth lens unit having a positive refractive power,
    wherein an interval between the first lens unit and the second lens unit is increased during zooming from a wide angle end to a telephoto end,
    wherein an interval between adjacent lens units is changed during zooming,
    wherein the first lens unit consists of, in order from the object side to the image side, a positive lens G11 having a convex surface facing the object side and a meniscus negative lens G12 having a convex surface facing the object side, and
    wherein the following conditional expression is satisfied:

$$0.0<(r12a-r12b)/(r12a+r12b)\le 0.6,$$

where r12a represents a curvature radius of an object-side lens surface of the meniscus negative lens G12, and r12b represents a curvature radius of an image-side lens surface of the meniscus negative lens G12.

12. A zoom lens, comprising, in order from an object side to an image side:
    a first lens unit having a positive refractive power;
    a second lens unit having a negative refractive power;
    a third lens unit having a positive refractive power;
    a fourth lens unit having a positive refractive power;
    a fifth lens unit having a negative refractive power; and
    a sixth lens unit having a positive refractive power,
    wherein an interval between the first lens unit and the second lens unit is increased during zooming from a wide angle end to a telephoto end,
    wherein an interval between adjacent lens units is changed during zooming,
    wherein the first lens unit consists of, in order from the object side to the image side, a positive lens G11 having a convex surface facing the object side and a meniscus negative lens G12 having a convex surface facing the object side, and
    wherein the following conditional expression is satisfied:

$$0.6\le r12b/fw\le 3.5,$$

where r12b represents a curvature radius of an image-side lens surface of the meniscus negative lens G12, and fw represents a focal length of the zoom lens at the wide angle end.

13. A zoom lens, comprising, in order from an object side to an image side:
    a first lens unit having a positive refractive power;
    a second lens unit having a negative refractive power;
    a third lens unit having a positive refractive power;
    a fourth lens unit having a positive refractive power;
    a fifth lens unit having a negative refractive power; and
    a sixth lens unit having a positive refractive power;
    wherein an interval between the first lens unit and the second lens unit is increased during zooming from a wide angle end to a telephoto end,
    wherein an interval between adjacent lens units is changed during zooming,
    wherein the first lens unit consists of, in order from the object side to the image side, a positive lens G11 having a convex surface facing the object side and a meniscus negative lens G12 having a convex surface facing the object side, and
    wherein the following conditional expression is satisfied:

$$55.0\le vdG11\le 100.0,$$

where vdG11 represents an Abbe number of a material of the positive lens G11.

14. A zoom lens, comprising, in order from an object side to an image side:
    a first lens unit having a positive refractive power;
    a second lens unit having a negative refractive power;
    a third lens unit having a positive refractive power;
    a fourth lens unit having a positive refractive power;
    a fifth lens unit having a negative refractive power; and
    a sixth lens unit having a positive refractive power,
    wherein an interval between the first lens unit and the second lens unit is increased during zooming from a wide angle end to a telephoto end,
    wherein an interval between adjacent lens units is changed during zooming,
    wherein the first lens unit consists of, in order from the object side to the image side, a positive lens G11 having a convex surface facing the object side and a meniscus negative lens G12 having a convex surface facing the object side, and
    wherein the following conditional expression is satisfied:

$$0.58<Skw/fw<1.00,$$

where Skw represents a back focus at the wide angle end, and fw represents a focal length of the zoom lens at the wide angle end.

15. A zoom lens, comprising, in order from an object side to an image side:
    a first lens unit having a positive refractive power;
    a second lens unit having a negative refractive power;
    a third lens unit having a positive refractive power;
    a fourth lens unit having a positive refractive power;
    a fifth lens unit having a negative refractive power; and
    a sixth lens unit having a positive refractive power,
    wherein an interval between the first lens unit and the second lens unit is increased during zooming from a wide angle end to a telephoto end,
    wherein, during zooming from the wide angle end to the telephoto end, the second lens unit is configured not to move, and the first lens unit, the third lens unit, the fourth lens unit, the fifth lens unit, and the sixth lens unit are configured to move toward the object side,
    wherein an interval between adjacent lens units is changed during zooming, and
    wherein the first lens unit consists of, in order from the object side to the image side, a positive lens G11 having a convex surface facing the object side and a meniscus negative lens G12 having a convex surface facing the object side.

* * * * *